US011631857B2

(12) United States Patent
Baek et al.

(10) Patent No.: US 11,631,857 B2
(45) Date of Patent: Apr. 18, 2023

(54) SECONDARY BATTERY

(71) Applicant: LG Chem, Ltd., Seoul (KR)

(72) Inventors: Joo Yul Baek, Daejeon (KR); Young Min Lim, Daejeon (KR); Jun Muk Lim, Daejeon (KR); Sang Hoon Choy, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 240 days.

(21) Appl. No.: 16/959,347

(22) PCT Filed: Feb. 22, 2019

(86) PCT No.: PCT/KR2019/002233
§ 371 (c)(1),
(2) Date: Jun. 30, 2020

(87) PCT Pub. No.: WO2019/164343
PCT Pub. Date: Aug. 29, 2019

(65) Prior Publication Data
US 2020/0358103 A1    Nov. 12, 2020

(30) Foreign Application Priority Data
Feb. 23, 2018 (KR) .................. 10-2018-0022065

(51) Int. Cl.
*H01M 4/62* (2006.01)
*H01M 4/505* (2010.01)
*H01M 4/525* (2010.01)
*H01M 10/0525* (2010.01)
*H01M 10/0567* (2010.01)
*H01M 10/0568* (2010.01)
*H01M 10/42* (2006.01)
*H01M 4/02* (2006.01)

(52) U.S. Cl.
CPC .......... *H01M 4/625* (2013.01); *H01M 4/505* (2013.01); *H01M 4/525* (2013.01); *H01M 10/0525* (2013.01); *H01M 10/0567* (2013.01); *H01M 10/0568* (2013.01); *H01M 10/4235* (2013.01); *H01M 2004/021* (2013.01); *H01M 2004/028* (2013.01); *H01M 2300/0025* (2013.01)

(58) Field of Classification Search
None
See application file for complete search history.

(56) References Cited

U.S. PATENT DOCUMENTS

| 6,433,061 B1 | 8/2002 | Marchant et al. |
| 2012/0208070 A1 | 8/2012 | Nakashima et al. |
| 2016/0141618 A1* | 5/2016 | Lim ............ H01M 4/625 |
| | | 252/506 |
| 2017/0222264 A1 | 8/2017 | Morinaka et al. |
| 2018/0219212 A1 | 8/2018 | Seol et al. |
| 2019/0044150 A1 | 2/2019 | Kim et al. |

FOREIGN PATENT DOCUMENTS

| CN | 1471545 A | 1/2004 |
| JP | H06020705 A | 1/1994 |
| JP | 2010116475 A | 5/2010 |
| JP | 2013084591 A | 5/2013 |
| JP | 2013227578 A | 11/2013 |
| JP | 2016035820 A | 3/2016 |
| JP | 2018-78103 * | 5/2018 |
| KR | 20120062713 A | 6/2012 |
| KR | 20150109240 A | 10/2015 |
| KR | 20170069153 A | 6/2017 |
| KR | 20170110995 A | 10/2017 |
| KR | 20170113250 A | 10/2017 |
| KR | 20180014986 A | 2/2018 |
| TH | 115991 A | 8/2012 |

OTHER PUBLICATIONS

Search report from International Application No. PCT/KR2019/002233, dated May 27, 2019.
European Search Report for Application No. 19756977.5, dated Dec. 15, 2020, 10 pages.
Malvern Instruments Worldwide: "A Basic Guide to Particle Characterization"—White Paper, May 2, 2012 (May 2, 2012), pp. 1-26, XP055089322.
R Brdicka et al: "Surface area and pore size determination Modern Methods in Heterogeneous Catalysis Research", Handbook of Heterogeneous Catalysis, VCH, Weinheim Handbook of Porous Solids, Jan. 1, 2004 (Jan. 1, 2004 ), XP055643749.
Search Report dated Sep. 15, 2022 from the Office Action for Chinese Application No. 201980007109.9 dated Sep. 21, 2022, 2 pages.

* cited by examiner

*Primary Examiner* — Laura Weiner
(74) *Attorney, Agent, or Firm* — Lerner David LLP

(57) ABSTRACT

A secondary battery includes a positive electrode, a negative electrode, a separator disposed between the positive electrode and the negative electrode, and an electrolyte solution, wherein the positive electrode includes a current collector and a positive electrode active material layer disposed on the current collector, the positive electrode active material layer includes a positive electrode active material and carbon nanotubes, and the electrolyte solution includes a non-aqueous solvent, a lithium salt, and tetravinylsilane.

6 Claims, No Drawings

SECONDARY BATTERY

TECHNICAL FIELD

Cross-Reference to Related Applications

The present application is a national phase entry under 35 U.S.C. § 371 of International Application No. PCT/KR2019/002233 filed Feb. 22, 2019, which claims priority from Korean Patent Application No. 10-2018-0022065, filed on Feb. 23, 2018, in the Korean Intellectual Property Office, the disclosures of which are incorporated herein by reference.

TECHNICAL FIELD

The present invention relates to a secondary battery including a positive electrode, a negative electrode, a separator disposed between the positive electrode and the negative electrode, and an electrolyte solution, wherein the positive electrode includes a current collector and a positive electrode active material layer disposed on the current collector, the positive electrode active material layer includes a positive electrode active material and carbon nanotubes, and the electrolyte solution includes a non-aqueous solvent, a lithium salt, and tetravinylsilane.

BACKGROUND ART

Demand for batteries as an energy source has been significantly increased as technology development and demand with respect to mobile devices have recently increased, and a variety of researches on batteries capable of meeting various needs have been carried out accordingly. Particularly, as a power source for such devices, research into lithium secondary batteries having excellent lifetime and cycle characteristics as well as high energy density has been actively conducted.

A lithium secondary battery denotes a battery in which a non-aqueous electrolyte containing lithium ions is included in an electrode assembly which includes a positive electrode including a positive electrode active material capable of intercalating/deintercalating the lithium ions, a negative electrode including a negative electrode active material capable of intercalating/deintercalating the lithium ions, and a microporous separator disposed between the positive electrode and the negative electrode.

The positive electrode and/or the negative electrode may include a conductive agent to improve conductivity. Conventionally, a point-type conductive agent, such as carbon black, has mainly been used, and a line-type conductive agent, such as carbon nanotubes and carbon nanofibers, has also been used to further improve the conductivity. With the introduction of the line-type conductive agent, it is possible to achieve the same level of conductivity as the existing battery even with a smaller amount of the conductive agent, and, accordingly, it is advantageous in that an amount of the active material may be relatively increased.

However, in a case in which the line-type conductive agent is used, since an electrolyte side reaction excessively occurs due to the relatively increased amount of the active material, gas is unintentionally and excessively generated.

Accordingly, since the battery is inflated or damaged, characteristics of the battery are significantly degraded.

Thus, there is a need to develop a secondary battery in which capacity is high, resistance is low, and the gas generation due to the electrolyte side reaction may be effectively suppressed.

DISCLOSURE OF THE INVENTION

Technical Problem

An aspect of the present invention provides a secondary battery in which capacity is high, resistance is low, and gas generation due to an electrolyte side reaction may be effectively suppressed.

Technical Solution

According to an aspect of the present invention, there is provided a secondary battery including a positive electrode, a negative electrode, a separator disposed between the positive electrode and the negative electrode, and an electrolyte solution, wherein the positive electrode includes a current collector and a positive electrode active material layer disposed on the current collector, the positive electrode active material layer includes a positive electrode active material and carbon nanotubes, and the electrolyte solution includes a non-aqueous solvent, a lithium salt, and tetravinylsilane.

Advantageous Effects

According to the present invention, conductivity of a positive electrode may be improved by using carbon nanotubes. Also, since the conductivity of the positive electrode may be maintained even if an amount of the carbon nanotubes is reduced, an amount of a positive electrode active material may be increased, and thus, battery capacity may be improved. Since tetravinylsilane is used in an electrolyte solution in addition to the use of the carbon nanotubes, a film may be effectively formed on the positive electrode, and thus, gas generation in a battery may be suppressed. Accordingly, lifetime and safety of the battery may be improved.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A secondary battery according to an embodiment of the present invention includes a positive electrode, a negative electrode, a separator disposed between the positive electrode and the negative electrode, and an electrolyte solution, wherein the positive electrode includes a current collector and a positive electrode active material layer disposed on the current collector, the positive electrode active material layer includes a positive electrode active material and carbon nanotubes, and the electrolyte solution includes a non-aqueous solvent, a lithium salt, and tetravinylsilane.

The positive electrode may include a current collector and a positive electrode active material layer disposed on the current collector.

The current collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used as the current collector. Specifically, a transition metal that adsorbs carbon well, such as copper and nickel, may be used as the current collector.

The positive electrode active material layer may be disposed on one surface or both surfaces of the current collector.

The positive electrode active material layer may include a positive electrode active material and carbon nanotubes.

The positive electrode active material may include at least one selected from a lithium cobalt oxide ($LiCoO_2$) and $Li[Ni_{x1}Mn_{y1}Co_{z1}]O_2$ ($0.36<x1<0.88$, $0.06<y1<0.32$, $0.06 \leq z1 \leq 0.32$, $x1+y1+z1=1$). Output, capacity, and stability of the battery may be improved when the positive electrode active material is used. Also, gas may be excessively generated in the battery as an amount of the positive electrode active material is increased, but, since tetravinylsilane as well as carbon nanotubes is used in the present invention, gas generation may be suppressed.

The positive electrode active material may be included in an amount of 96.5 wt % to 98.8 wt % in the positive electrode active material layer, and may specifically be included in an amount of 97 wt % to 98.3 wt %. Since the carbon nanotubes are used as a conductive agent, an amount of the carbon nanotubes may be adjusted to a low level, and thus, the amount of the positive electrode active material may be relatively increased. Therefore, the amount range corresponds to a numerical range which may be obtained depending on the use of the carbon nanotubes.

The carbon nanotubes may act as a positive electrode conductive agent in the present invention. Specifically, the positive electrode active material layer may only include the carbon nanotubes as the positive electrode conductive agent. For example, in a case in which the positive electrode active material layer includes a particle-shaped conductive agent, such as acetylene black, or a plate-shaped conductive agent in addition to the carbon nanotubes, conductivity of a positive electrode may be reduced in comparison to conductivity of the positive electrode of the present invention.

The carbon nanotubes may act as a conductive agent in the positive electrode active material layer.

The carbon nanotubes may be bundle-type carbon nanotubes. The bundle-type carbon nanotubes may include a plurality of carbon nanotube units. Specifically, the expression "bundle type" used herein, unless otherwise specified, refers to a secondary shape in the form of a bundle or rope in which the plurality of carbon nanotube units are aligned side by side or intertwined in substantially the same orientation as a longitudinal axis of the carbon nanotube unit. In the carbon nanotube unit, a graphite sheet has a cylindrical shape with a nano-sized diameter and has an $sp^2$ bond structure. In this case, the carbon nanotube unit may exhibit characteristics of a conductor or semiconductor depending on a structure and an angle at which the graphite sheet is rolled. The carbon nanotube unit may be classified into a single-walled carbon nanotube (SWCNT) unit, a double-walled carbon nanotube (DWCNT) unit, and a multi-walled carbon nanotube (MWCNT) unit depending on the number of bonds forming the wall.

Specifically, the carbon nanotube unit may be a multi-walled carbon nanotube unit. The multi-walled carbon nanotube unit is preferable in terms of having lower energy required for dispersion than the single-walled carbon nanotube unit or the double-walled carbon nanotube unit and having an easily controllable dispersion condition.

The carbon nanotubes may have a Brunauer-Emmett-Teller (BET) specific surface area of 100 $m^2/g$ to 300 $m^2/g$, specifically 125 $m^2/g$ to 275 $m^2/g$, and more specifically 150 $m^2/g$ to 250 $m^2/g$. In a case in which the BET specific surface area of the carbon nanotubes satisfies the above range, since the carbon nanotubes may be uniformly dispersed in the positive electrode, the conductivity of the positive electrode may be improved and battery resistance may be reduced. The BET specific surface area may be measured by a nitrogen adsorption BET method.

The carbon nanotube unit may have an average diameter of 1 nm to 30 nm, specifically 3 nm to 26 nm, and more specifically 5 nm to 22 nm. In a case in which the average diameter of the carbon nanotube unit satisfies the above range, since the carbon nanotubes may be uniformly dispersed in the positive electrode, the conductivity of the positive electrode may be improved and the battery resistance may be reduced. When the carbon nanotube unit is viewed as a cylinder, the average diameter may denote a diameter of a circular cross section of the cylinder. The average diameter may be measured with a transmission electron microscope (TEM) or a scanning electron microscope (SEM).

The carbon nanotubes may be included in an amount of 0.3 wt % to 1.2 wt % based on a total weight of the positive electrode active material layer, and may specifically be included in an amount of 0.4 wt % to 1.1 wt %. In a case in which a point-type conductive agent, such as carbon black, is used instead of the carbon nanotubes, an amount of carbon black, which is higher than the above range, is required in order to achieve an equivalent level of conductivity of the positive electrode. In contrast, since the carbon nanotubes are used as the conductive agent in the present invention, the equivalent level of conductivity of the positive electrode may be achieved even by using a smaller amount of the carbon nanotubes than the amount of the general point-type conductive agent.

The positive electrode active material layer may further include a binder. The binder may include at least one selected from the group consisting of a polyvinylidene fluoride-hexafluoropropylene copolymer (PVDF-co-HFP), polyvinylidene fluoride (PVdF), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The binder may further include a non-fluorinated binder. The non-fluorinated binder may include at least one selected from a nitrile butadiene rubber (NBR) and a hydrogenated-nitrile butadiene rubber (H-NBR) and may specifically be a hydrogenated-nitrile butadiene rubber.

The electrolyte solution may include a non-aqueous solvent, a lithium salt, and tetravinylsilane.

The non-aqueous solvent may be an aprotic organic solvent such as N-methyl-2-pyrro lidone, ethyl methyl carbonate, propylene carbonate, ethylene carbonate, butylene carbonate, dimeth yl carbonate, diethyl carbonate, γ-butyrolactone, 1,2-dimethoxy ethane, 2-methyl tetrahydrofuran, dimethyl sulfoxide, 1,3-dioxolane, formamide, dimethylformamide, dioxolane, acet onitrile, nitromethane, methyl formate, methyl acetate, phosphate triester, trimethoxy methane, a dio xolane derivative, sulfolane, methyl sulfolane, 1,3-dimethyl-2-imidazolidinone, a propylene carbonate derivative, a tetrahydrofuran derivative, ether, methyl propionate, and ethyl propionate, and a mixture of two or more of the non-aqueous solvents may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

Specifically, the non-aqueous solvent may be a mixture of ethylene carbonate and ethyl methyl carbonate.

The lithium salt may include at least one selected from the group consisting of lithium bis(fluorosulfonyl)imide (LiFSI), lithium difluorophosphate (LiDFP), and lithium tetrafluoroborate ($LiBF_4$). In a case in which the lithium salts are used together with tetravinylsilane, since a film may be smoothly formed on surfaces of the positive electrode and the negative electrode, a side reaction between the electrolyte solution and the positive electrode and/or the negative electrode may be effectively suppressed.

Since the LiFSI may effectively form a film on the surfaces of the positive electrode and the negative electrode during charge and discharge of the battery, high-temperature stability of the secondary battery may be improved in comparison to a case where other lithium salts, such as $LiPF_6$, are used. The LiFSI may be included in an amount of 0.01 wt % to 5 wt % in the electrolyte solution, and may specifically be included in an amount of 0.015 wt % to 4.9 wt %. In a case in which the amount of the LiFSI satisfies the above range, high-temperature stability characteristics of the battery may be further improved.

The LiDFP may effectively form a film on the surfaces of the positive electrode and the negative electrode during charge and discharge of the battery. Particularly, since the film formed on the positive electrode by the LIDFP may suppress the generation of oxygen from the positive electrode, volume expansion of the battery may be suppressed during charge and discharge. The LiDFP may be included in an amount of 0.01 wt % to 1.5 wt % in the electrolyte solution, and may specifically be included in an amount of 0.015 wt % to 1.45 wt %. In a case in which the amount of the LiDFP satisfies the above range, the high-temperature stability characteristics of the battery may be further improved.

The $LiBF_4$ may effectively form a film on the surfaces of the positive electrode and the negative electrode during charge and discharge of the battery. Thus, the $LiBF_4$ may improve battery lifetime in comparison to the case where other lithium salts, such as $LiPF_6$, are used. The $LiBF_4$ may be included in an amount of 0.01 wt % to 1.0 wt % in the electrolyte solution, and may specifically be included in an amount of 0.1 wt % to 0.5 wt %. In a case in which the amount of the $LiBF_4$ satisfies the above range, life characteristics of the battery may be further improved.

The tetravinylsilane may effectively form a film on the positive electrode and the negative electrode, and, particularly, the tetravinylsilane may effectively reduce gas generation due to a reaction of the electrolyte solution with the positive electrode at high temperature. Accordingly, lifetime and safety of the secondary battery may be improved. Also, in the present embodiment, the positive electrode active material layer includes carbon nanotubes. In a case in which the carbon nanotubes, different from the point-type conductive agent such as carbon black, are used, since the amount of the positive electrode active material may be increased, an amount of the positive electrode active material present on the surface of the positive electrode may be increased. Accordingly, since the film generated by a reaction of the positive electrode active material with the tetravinylsilane may be formed over a wider range of the surface of the positive electrode, an effect of suppressing the gas generation may be further improved.

The tetravinylsilane may be included in an amount of 0.020 wt % to 0.450 wt % in the electrolyte solution, may specifically be included in an amount of 0.055 wt % to 0.290 wt %, and may more specifically be included in an amount of 0.060 wt % to 0.280 wt %. In a case in which the amount of the tetravinylsilane satisfies the above range, the gas generation at high temperature may be effectively suppressed and an excessive increase in resistance of the battery may be prevented at the same time.

The secondary battery of the present embodiment may satisfy the following Equation 1, and may specifically satisfy the following Equation 2.

[Equation 1]

$$0.214 < (0.2778 \times A) + B < 0.594$$

[Equation 2]

$$0.27 \leq (0.2778 \times A) + B \leq 0.50$$

A is the amount of the carbon nanotubes in the positive electrode active material layer, a unit of A is wt %, B is the amount of the tetravinylsilane in the electrolyte solution, and a unit of B is wt %.

The carbon nanotubes may be used as described above in order to improve the conductivity of the positive electrode and increase the amount of the positive electrode active material. However, in a case in which the carbon nanotubes are included in the positive electrode active material layer, since a phenomenon, in which the positive electrode active material is broken due to the increased amount of the positive electrode active material, is increased, a side reaction between the electrolyte solution and the positive electrode active material is increased. Accordingly, the gas generation in the secondary battery at high temperature is increased. Thus, it is important to include and use the tetravinylsilane in the electrolyte solution to suppress the gas generation. In this case, an optimum amount of the tetravinylsilane, by which the excessive increase in the resistance of the battery may be prevented while the gas generation may be suppressed as much as possible, is required in consideration of the amount of the carbon nanotubes included in the positive electrode active material layer. Considering this, if the secondary battery satisfies Equation 1, the capacity improvement, resistance reduction, and gas generation suppression effects may be further improved.

The negative electrode may include a negative electrode collector and a negative electrode active material layer disposed on one surface or both surfaces of the negative electrode collector.

The negative electrode collector is not particularly limited as long as it has conductivity without causing adverse chemical changes in the battery. For example, copper, stainless steel, aluminum, nickel, titanium, fired carbon, or aluminum or stainless steel that is surface-treated with one of carbon, nickel, titanium, or silver may be used as the negative electrode collector. Specifically, a transition metal that adsorbs carbon well, such as copper and nickel, may be used as the current collector.

The negative electrode active material layer may include a negative electrode active material, a negative electrode conductive agent, and a negative electrode binder.

The negative electrode active material may include graphite-based active material particles or silicon-based active material particles. At least one selected from the group consisting of artificial graphite, natural graphite, graphitized carbon fibers, and graphitized mesocarbon microbeads may be used as the graphite-based active material particles, and rate capability may be improved particularly when the artificial graphite is used. At least one selected from the group consisting of silicon (Si), $SiO_x$ (0<x<2), a Si—C composite, and a Si—Y alloy (where Y is an element selected from the group consisting of alkali metal, alkaline earth metal, transition metal, a Group 13 element, a Group 14 element, a rare earth element, and a combination thereof) may be used as the silicon-based active material particles, and high capacity of the battery may be obtained particularly when Si is used.

The negative electrode binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, poly acrylic acid, and a material having hydrogen thereof substituted with lithium (Li), sodium (Na), or calcium (Ca), or may include various copolymers thereof.

The negative electrode conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The separator may be disposed between the positive electrode and the negative electrode. The separator separates the negative electrode and the positive electrode and provides a movement path of lithium ions, wherein any separator may be used as the separator without particular limitation as long as it is typically used in a secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of a medium and large sized device selected from the group consisting of an electric vehicle, a hybrid electric vehicle, a plug-in hybrid electric vehicle, and a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1: Preparation of Secondary Battery (1) Positive Electrode Preparation $Li[Ni_{0.6}Mn_{0.2}Co_{0.2}]O_2$ having an average particle diameter ($D_{50}$) of 12 µm was used as a positive electrode active material, PVdF having a weight-average molecular weight of 900,000 g/mol was used as a binder, and bundle-type carbon nanotubes (specific surface area of 190 $m^2/g$) composed of carbon nanotube units (multi-walled) were used as a conductive agent, wherein an average diameter of the carbon nanotube unit was 12 nm.

A conductive agent dispersion including the carbon nanotubes, a hydrogenated-nitrile butadiene rubber (H-NBR), and N-methylpyrrolidone (NMP), as a dispersion medium, was prepared. Thereafter, the positive electrode active material, the pVdF, the conductive agent dispersion, and the NMP were mixed to prepare a positive electrode slurry in which a solid content was 72% and a weight ratio of the positive electrode active material, the carbon nanotubes, the pVdF, and the H-NBR was 97.5:0.7:1.7:0.1.

A 20 µm thick aluminum current collector was coated with the prepared positive electrode slurry such that an electrode loading (mg/$cm^2$) was 27.2 mg per unit area. Thereafter, the current collector coated with the positive electrode slurry was dried in a vacuum oven at 130° C. for 6 hours and then rolled at a pressure of 10 MPa using a roll heated to 60° C. Accordingly, a positive electrode having a final thickness (current collector+active material layer) of 95 µm was prepared. The positive electrode was subsequently punched out to a size of 3.0 cm×5.5 cm. An amount of the carbon nanotubes in the positive electrode active material layer was 0.7 wt %.

(2) Negative Electrode Preparation

Natural graphite as a negative electrode active material, carbon black as a negative electrode conductive agent, and a styrene-butadiene rubber (SBR), as a negative electrode binder, were respectively mixed in distilled water in a weight ratio of 92:2:6 to prepare a negative electrode slurry. After a 20 µm thick negative electrode collector (Cu) was coated with the prepared negative electrode slurry, the negative electrode collector coated with the negative electrode slurry was dried in a vacuum oven at 80° C. for 6 hours and then rolled at a pressure of 10 MPa using a roll heated to 60° C. Accordingly, a negative electrode having a final thickness (current collector+active material layer) of 85 µm was prepared (loading amount: 450 mg/25 $cm^2$). The negative electrode was subsequently punched out to a size of 3.1 cm×5.6 cm.

(3) Electrolyte Solution Preparation

A solvent, in which ethylene carbonate and ethyl methyl carbonate were mixed in a volume ratio of 3:7, was used as a non-aqueous solvent. Tetravinylsilane, 1,3-propane sultone, LiDFP, ethylene sulfate, LiBF$_4$, and fluorobenzene were added to the non-aqueous solvent such that an amount of each material was 0.2 wt %, 0.5 wt %, 1.0 wt %, 1.0 wt %, 0.2 wt %, and 6.0 wt % in an electrolyte solution, respectively, and then mixed to prepare the electrolyte solution.

(4) Separator Preparation

A 10 μm thick porous polyethylene was used as a separator.

(5) Preparation of Secondary Battery

The separator was disposed between the above-prepared positive electrode and negative electrode and a battery was assembled by using a stacking method. 400 ml of the above-prepared electrolyte solution was injected into the assembled battery to prepare a secondary battery of Example 1.

Example 2: Preparation of Secondary Battery

A secondary battery was prepared in the same manner as in Example 1 except that tetravinylsilane was used in an amount of 0.40 wt % in an electrolyte solution during the preparation of the electrolyte solution.

Example 3: Preparation of Secondary Battery

A secondary battery was prepared in the same manner as in Example 1 except that tetravinylsilane was used in an amount of 0.02 wt % in an electrolyte solution during the preparation of the electrolyte solution.

Example 4: Preparation of Secondary Battery

A secondary battery was prepared in the same manner as in Example 1 except that an amount of carbon nanotubes in a positive electrode active material layer was 0.2 wt % during the preparation of a positive electrode (weight ratio of the positive electrode active material, carbon nanotubes, PVdF, and H-NBR in the positive electrode active material layer was 98.0:0.2:1.7:0.1).

Comparative Example 1

A secondary battery was prepared in the same manner as in Example 1 except that tetravinylsilane was not used during the preparation of an electrolyte solution.

Comparative Example 2

A secondary battery was prepared in the same manner as in Example 1 except that the same amount of methyltrivinylsilane, instead of tetravinylsilane, was used during the preparation of an electrolyte solution.

TABLE 1

| | Amount of carbon nanotubes in positive electrode active material layer (wt %) | Amount of tetra-vinylsilane in electrolyte solution (wt %) | Equation: 0.2778 × A + B |
|---|---|---|---|
| Example 1 | 0.7 | 0.20 | 0.394 |
| Example 2 | 0.7 | 0.40 | 0.594 |
| Example 3 | 0.7 | 0.02 | 0.214 |
| Example 4 | 0.2 | 0.20 | 0.256 |
| Comparative Example 1 | 0.7 | 0 | 0.194 |
| Comparative Example 2 | 0.7 | Tetravinylsilane was not used. 0.20 wt % of methyltrivinylsilane was used | — |

A is the amount of the carbon nanotubes in the positive electrode active material layer, a unit of A is wt %, B is the amount of the tetravinylsilane in the electrolyte solution, and a unit of B is wt %.

Experimental Example 1: Check Degree of Gas Generation

After activation of the secondary batteries of Examples 1 to 4 and Comparative Examples 1 and 2, the batteries were exposed to 85° C. for 10 hours, gas generated in each battery was then collected by a water displacement method, and amounts of the gas generated are presented in Table 2.

Experimental Example 2: Capacity Retention Evaluation

Batteries of Examples 1 to 4 and Comparative Examples and 2 were charged and discharged to evaluate capacity retentions, and the results thereof are presented in Table 2.

Each battery was charged and discharged at 0.5 C in a $1^{st}$ cycle and a $2^{nd}$ cycle at 45° C. and charged and discharged at 0.5 C/1.0 C from a $3^{rd}$ cycle to a $500^{th}$ cycle.

Charge condition: CC (constant current)/CV (constant voltage) (4.25 V/0.05 C cut-off)

Discharge condition: CC (constant current) condition 2.5 V cut-off

Capacity retention was derived by the following calculation.

Capacity retention (%)=($500^{th}$ cycle discharge capacity/$1^{st}$ cycle discharge capacity)×100

Experimental Example 3: Battery Initial Resistance Evaluation

Initial resistance of each of the batteries of Examples 1 to 4 and Comparative Examples 1 and 2 was calculated from a voltage drop when applying a current of 2.5 C for 30 seconds in a state in which each battery was charged to 50% of total capacity of the battery, and the results thereof are presented in Table 2.

TABLE 2

|  | Gas generation amount (μℓ) | Capacity retention (%) | Battery Initial resistance (Ω) |
| --- | --- | --- | --- |
| Example 1 | 39.1 | 92.1 | 1.18 |
| Example 2 | 37.2 | 91.8 | 1.32 |
| Example 3 | 83.5 | 75.9 | 1.19 |
| Example 4 | 37.9 | 70.0 | 1.22 |
| Comparative Example 1 | 113.8 | 68.1 | 1.21 |
| Comparative Example 2 | 105.3 | 66.9 | 1.20 |

Referring to Table 2, it may be understood that Examples 1 to 4 had significantly lower amounts of the gas generated and higher capacity retentions than Comparative Examples in which tetravinylsilane was not used. It may be confirmed that the amount of the gas generated of Example 1, in which the amounts of the carbon nanotubes and the tetravinylsilane satisfied Equation 1 of the present invention, was equivalent to the amounts of the gas generated of Examples 2 to 4, in which Equation 1 was not satisfied, and both the capacity retention and the battery initial resistance of Example 1 were improved in comparison to those of Examples 2 to 4.

The invention claimed is:

1. A secondary battery comprising a positive electrode, a negative electrode, a separator disposed between the positive electrode and the negative electrode, and an electrolyte solution, wherein the positive electrode comprises a current collector and a positive electrode active material layer disposed on the current collector, the positive electrode active material layer comprises a positive electrode active material and a conductive agent consisting of carbon nanotubes, and the electrolyte solution comprises a non-aqueous solvent, a lithium salt, and tetravinylsilane, wherein the carbon nanotubes are included in an amount of 0.3 wt % to 1.2 wt % in the positive electrode active material layer, wherein the tetravinylsilane is included in an amount of 0.020 wt % to 0.450 wt % in the electrolyte solution, wherein the lithium salt comprises at least one selected from the group consisting of LiFSI, LiDFP, and $LiBF_4$, and wherein the secondary battery satisfies Equation 1:

[Equation 1]

$$0.214 < (0.2778 \times A) + B < 0.594$$

wherein A is an amount of the carbon nanotubes in the positive electrode active material layer, and a unit of A is wt %, and B is an amount of the tetravinylsilane in the electrolyte solution, and a unit of B is wt %.

2. The secondary battery of claim 1, wherein the carbon nanotubes have a Brunauer-Emmett-Teller (BET) specific surface area of 100 $m^2$/g to 300 $m^2$/g.

3. The secondary battery of claim 1, wherein the carbon nanotubes are bundle-type carbon nanotubes which include a plurality of carbon nanotube units.

4. The secondary battery of claim 3, wherein the carbon nanotube unit has an average diameter of 1 nm to 30 nm.

5. The secondary battery of claim 1, wherein the positive electrode active material comprises at least one selected from the group consisting of $LiCoO_2$ and $Li[Ni_{x1}Mn_{y1}Co_{z1}]O_2$, wherein $0.36 < x1 < 0.88$, $0.06 < y1 < 0.32$, $0.06 < z1 < 0.32$, and $x1+y1+z1=1$.

6. The secondary battery of claim 1, wherein the positive electrode active material is included in an amount of 96.5 wt % to 98.8 wt % in the positive electrode active material layer.

* * * * *